United States Patent [19]

Shirouzu

[11] 3,757,468

[45] Sept. 11, 1973

[54] SEEDLING GROWER AND METHOD OF PLANTING SEEDLING CULTIVATED IN THE SEEDLING GROWER

[75] Inventor: Atsushi Shirouzu, Sapporo City, Hokkaido, Japan

[73] Assignee: Kabushiki Kaisha Circle Tekkogo, Takikawa City, Japan

[22] Filed: Jan. 25, 1971

[21] Appl. No.: 109,360

[30] Foreign Application Priority Data

| Feb. 2, 1970 | Japan | 45/8578 |
| July 21, 1970 | Japan | 45/63717 |
| Feb. 24, 1970 | Japan | 45/15700 |
| July 8, 1970 | Japan | 45/59193 |
| July 8, 1970 | Japan | 45/59195 |

[52] U.S. Cl. ................... 47/34.13, 111/3
[51] Int. Cl. ........................ B31d 5/04, A01g 9/02
[58] Field of Search .................. 111/2-3; 47/34, 37, 34.13; 93/1; 229/28 R

[56] References Cited
UNITED STATES PATENTS

| 3,164,507 | 1/1965 | Masuda | 47/37 X |
| 3,515,036 | 6/1970 | Oki et al. | 47/37 X |
| 3,018,205 | 1/1962 | Barut | 47/34.13 X |
| 3,524,419 | 8/1970 | Middleton | 111/2 |

FOREIGN PATENTS OR APPLICATIONS

| 493,730 | 10/1938 | Great Britain |
| 1,573,377 | 7/1969 | France |
| 1,910,966 | 9/1969 | Germany |

Primary Examiner—Robert E. Bagwill
Attorney—Stevens, Davis, Miller & Mosher

[57] ABSTRACT

A seedling grower and a method of planting seedling cultivated in the seedling grower are disclosed. Said seedling grower is characterized by comprising a plurality of cells arranged in lattice form and formed by adhesively bonding together wall members made of a material such as paper, being collapsible when not in use and being able to be stretched into a spread lattice form from the collapsed state. Each of said cells is adapted to contain earth and cultivate a seedling therein.

2 Claims, 17 Drawing Figures

PATENTED SEP 11 1973

A. SHIROUZU
INVENTOR.

BY
Stevens, Davis, Miller & Mosher
ATTORNEYS

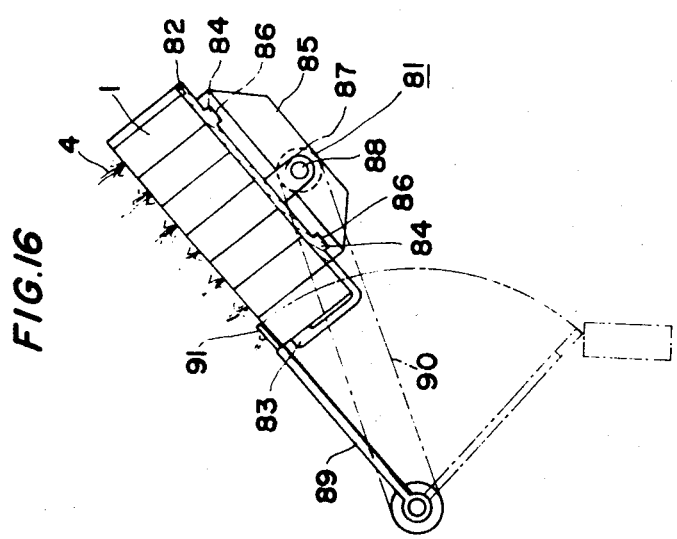
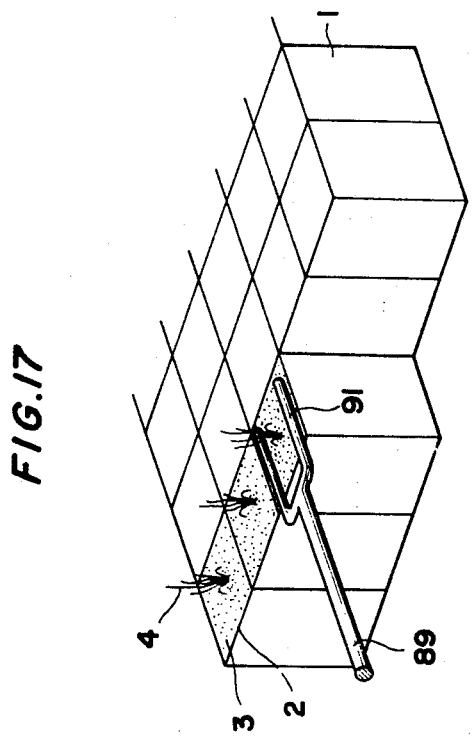

SEEDLING GROWER AND METHOD OF PLANTING SEEDLING CULTIVATED IN THE SEEDLING GROWER

This invention relates to a seedling grower and a method of making the same, as well as a method of planting, by means of a planting machine, seedlings or young plants cultivated by the seedling grower of this invention.

There has in recent years been a tendency to planting seedlings by means of a planting machine. There are various forms of seedlings for planting by a planting machine. The most important problem for the planting machine is the type of seedlings used with the machine.

The type of seedlings planted by a planting machine exerts marked influences on the nature and performance of the machine. Besides, it exerts great influences on the growth of young plants after being bedded out and hence on the yield of produce.

In one type of planting machines now being used, the operators cause seedlings or young plants to be gripped by a seedling holding device of the planting machine and transported thereby to furrows in the fields where the seedlings are planted by the machine. In this system, every seedling planted by a seedling grower must be handled by the operator, so that the planting operation requires much time. This sets limits to the capacity of the planting machines and lowers its efficiency.

In order to obviate this disadvantage of the prior art, proposals have been made to develop a planting machine which permits to deliver a large number of seedlings to the planting machine at one time and separate one seedling from another automatically when planted in the fields. The use of such planting machine requires, as a prerequisite, the growing of seedlings or young plants which have roots embedded in lumps of earth of uniform shape arranged in an orderly manner. Attention has been attracted in recent years to the development of such planting machine and means for cultivating seedling in the manner described.

Nearly all the seedlings of rice plants or young rice plants now being cultivated have earth attached to their roots. Machines used for planting them are such that it is necessary to cause roots of such seedlings to entangle with one another into a tape or mat form to increase their tensile strength during their cultivation so that the seedlings may maintain their shape. In order to cause the roots of seedlings to entangle with one another, they must be grown intimately and closely to one another. However, this system of cultivating seedlings has a disadvantage in that it is difficult to obtain middling or grown-up seedlings, all the seedlings being small in size. Thus, when this system of growing seedlings is employed, the young plants are small in size when bedded out and, in addition, these small seedlings must have their roots severed from one another in their peripheral surface. Such seedlings may not be handicapped in growth when planted in the fields in districts with a mild climate, but their growth will be markedly interfered with in cold districts, resulting in a great reduction in the yield of produce. Besides, there are limits to plants which permits to use this system of seedling cultivation.

In order to obviate the disadvantages of the aforementioned system of seedling cultivation, an attempt has been made to use paper tubes in cultivating young plants. In this system, a large number of paper tubes bonded to one another with a water-soluble adhesive agent and arranged in an orderly manner are stuffed with earth, and seeds are sown in the earth in such paper tubes so as to cultivate seedlings therein. When this system is employed, a large number of seedlings can be grown and transferred to a planting machine in a lot. This system permits separating the grown seedlings from one another as they are contained in the paper tubes in planting them in the fields. Since the paper tubes containing the seedlings are arranged in an orderly manner, it is possible to increase the efficiency of planting in the fields by using a planting machine which lends itself to automatic separation and planting of young plants.

Moreover, this system allows for providing a space sufficiently large for each seedling to grow therein into a fine young plant. In planting, the seedlings are planted as they are contained in the paper tubes, so that this system causes less damage to young plants than other conventional systems.

However, the aforementioned system of using paper tubes is not without disadvantages. Although this system offers the advantage of being able to separate one seedling from another completely, the roots of seedlings grown by this system have very low tensile strength unlike the seedlings whose roots are caused to entangle into mat form, so that the seedlings are liable to become disorderly on the planting machine. In addition, since the young plants are planted in the fields as they are contained in the paper tubes, the growth of roots after planting in the fields is sometimes hampered by the presence of paper when the paper used does not suit the condition of use.

To obviate the last-mentioned disadvantage, paper tubes made of a material comprising erosion resistant fibers and pulpy matter which undergoes decomposition in a certain period of time may be employed so that roots may grow from the side wall of paper tubes after planting in the fields. However, difficulties are experienced in adjusting the proportions of components of paper, and the growth of young plants in the field is sometimes interfered with.

This invention has as its object the provision of a seedling grower made of paper or other like material and having cells arranged in lattice form for cultivating seedlings or young plants one in each cell.

A set of seedlings are cultivated by the seedling grower according to this invention such that the need to handle them one by one is eliminated and labor can be saved when they are transferred to a planting machine. They are disposed with their roots being arranged in an orderly manner and permit the planting machine to automatically separate one seedling after another from the set.

In short, the seedling grower according to this invention obviates the disadvantages of the prior art while retaining the advantage thereof.

The seedling grower according to this invention can be fabricated readily because it can be made by arranging sheets of paper or other material and bonding them with an adhesive agent.

The seedling grower according to this invention is more economical than paper tubes of the prior art which require manual operation to separate one seedling from another. This invention eliminates the need to use special paper, such as the one which renders the wall of paper tubes reticular when the seedlings are planted. Besides, the quantity of paper used is markedly reduced.

The seedling grower according to this invention can be manufactured cheeply than the conventional paper tubes, because the adhesive process of tubular members is not required.

Further, the seedling grower according to this invention is collapsible and easy to handle when not in use.

When the seedling grower according to this invention is put to use, it is developed and the cells arranged in lattice form are stuffed with earth on which seeds are sown, so as to cultivate each seedling in one of such cells. By this arrangement, walls of each cell impart tensile strength to the seedling therein, so that the need to cultivate seedlings intimately and closely so as to cause their roots to entangle with one another is eliminated. This arrangement also allows for provide each seedling with a space of sufficiently large area to cause it to grow into a middling or grown-up young plant. The seedlings being cultivated in the cells of growers according to this invention spread roots in the cells and do not extend through the walls into the adjacent cells and entangle with one another.

When the seedlings cultivated by the seedling grower according to this invention are planted in the fields, they can be handled in one lot. They may be transferred in a lot to a planting machine which is adapted to handle seedlings arranged in mat form, for example, and one seedling after another is taken out and planted by tearing off the walls of cells by a delivery device of the machine. The seedlings can be planted smoothly because they do not become disorderly when transferred to the planting machine.

When the seedlings cultivated by the grower according to this invention are planted in the fields by the planting machine, each seedling is detached from the group by tearing off the walls of its cell, so that the seedlings planted in the fields can spread and fasten roots in the ground without hindrance because one side of their roots are not surrounded by paper walls.

Thus, the seedling grower according to this invention is used for both cultivating seedlings therein and planting young plants in the fields by a planting machine.

Additional objects as well as features and advantages of this invention will become evident from the description set forth hereinafter when considered in conjunction with the accompanying drawings, in which:

FIG. 16 is a side view of a device for delivering seedlings cultivated in the seedling grower according to this invention, with certain parts thereof being cut out; and FIG. 17 is a fragmentary perspective view of the seedling delivery device.

Figure 1:
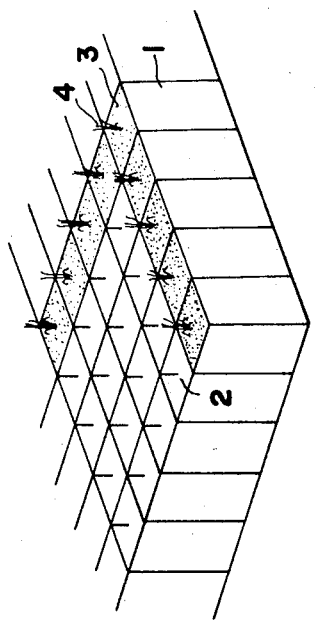
FIG. 1 is a perspective view of the seedling grower in its entirety according to this invention.

The seedling grower according to this invention generally designated 1 in FIG. 1 comprises a number of cells 2 arranged in lattice form and made by bonding together sheets of erosion resistant paper to provide walls thereof.

The cells 2 of the seedling grower 1 is stuffed with earth 3 on which seeds are sown. After the seeds are covered with earth, the seedling grower is placed on a bed so that seedlings or young plants 4 may be cultivated therein.

When the young plants 4 grown in this way are planted in the fields, the grower 1 is conveyed to the fields and planted by a planting machine.

Figure 2:
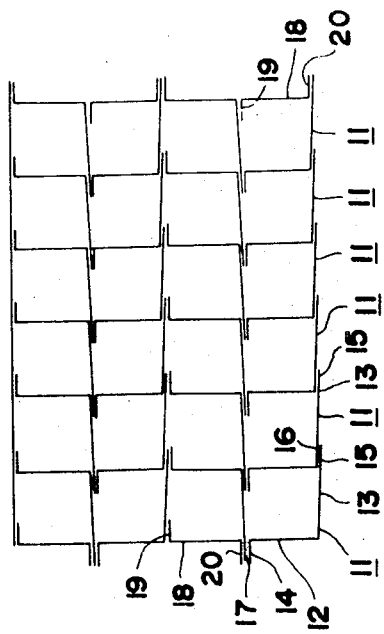
FIG. 2 is a plan view of a first embodiment of the seedling grower according to this invention.
Figure 3:
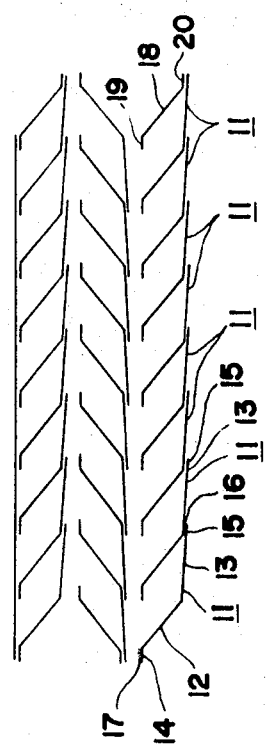
FIG. 3 is a plan view showing the method of fabrication of the embodiment shown in FIG. 2.

In FIGS. 2 and 3 which show a first embodiment of this invention, the numeral 11 is a base made of erosion resistant paper and including two adjacent side walls 12 and 13 disposed at right angles to each other, one side wall 12 having at its outer end a bonding portion 14 extending outwardly therefrom at right angles thereto and the other side wall 13 having at its outer end a bonding portion 15. The base 11 is substantially in the form of a letter Z.

A number of such bases 11 are arranged in a row, and the bonding portion 15 of the side wall 13 of a first base 11 is adhesively bonded at 16 to the base portion of the side wall 13 of a second base 11. The bonding portion 15 of the side wall 13 of the second base 11 is adhesively bonded at 16 to the base portion of a third base 11. This operation is repeated till a predetermined number of bases are bonded together to provide a set of such bases 11. In this way, a plurality of sets of bases 11 are prepared.

A plurality of sets of bases 11 are arranged in rows in side by side relation, and the bonding portion 14 of the side wall 12 of each base 11 in a first row of bases 11 is adhesively bonded at its outer surface at 17 to the bonding portion 15 of the side wall 13 of the adjacent base 11 in a second row of bases 11. Then, the bonding portion 14 of the side wall 12 of each base 11 in the second row of bases 11 is adhesively bonded at its outer surface at 17 to the bonding portion 15 of the side wall 13 of the adjacent base 11 in a third row of bases 11. This operation is repeated till a predetermined set of rows of bases 11 are bonded together.

An end member 18 made of the same material as the bases 11 may be used to connect the ends of the adjacent two rows of bases 11 by adhesively bonding opposite end portions 19 and 20 thereof to the ends of the adjacent rows of bases 11.

The bases 11 are adhesively bonded to one another as aforementioned to provide a plurality of cells 2 arranged in lattice form which cells are stuffed with earth, and seeds are sown on the earth in the cells and covered with earth. The seed grower 1 is then placed on the bed so that young plants may be cultivated therein.

The seedling grower 1 is transported to the fields and the seedlings 4 are planted in the fields by a planting machine.

In fabricating the seedling grower shown in FIGS. 2 and 3, the bases 11 made in an elongated tape form extending normal to the plane of FIG. 3 are arranged in a row and adhesively bonded together to provide a set of bases, and a plurality of sets of bases are arranged in several rows in side by side relation and successively bonded together. A plurality of rows of bases adhesively bonded together in this manner are cut transversely parallel to the plane of FIG. 3 into portions of a predetermined length to thereby provide a number of seedling growers 1.

The first embodiment of the seedling grower according to this invention can be collapsed when not in use and can be developed by gripping the opposite ends by hands into a shape shown in FIG. 2 when it is used for sowing seeds on the earth in its cells to grow seedlings.

A second embodiment will now be explained with reference to FIGS. 4 and 5. The numeral 21 designates a base 21 made of erosion resistant paper and includes two adjacent side walls 22 and 23 disposed at right angles to each other, the side walls 22 and 23 having bonding portions 24 and 25 at their ends respectively which are directed inwardly at right angles to the side walls 22 and 23. The base 21 is substantially in the form of a letter L.

A plurality of such bases 21 are arranged in a row, and the bonding portion 25 of the side wall 23 of a first base 21 is adhesively bonded at 26 to the base portion of the side wall 22 of a second base 21. The bonding portion 25 of the side wall 23 of the second base 21 is adhesively bonded at 26 to the base portion of the side wall 22 of a third base 21. This operation is repeated till a predetermined number of bases 21 are bonded together to provide a set of such bases 21. In this way, a plurality of sets of bases 21 are prepared.

A plurality of sets of bases 21 are arranged in rows in side by side relation, and the bonding portion 24 of the side wall 22 of each base 21 in a first row of bases 21 is adhesively bonded at 27 to the outer side of the end portion of the side wall 23 of the adjacent base 21 in a second row of bases 21. Then, the bonding portion 24 of the side wall 22 of each base 21 in the second row of bases 21 is adhesively bonded at 27 to the outer side of end portion of the side wall 23 of the adjacent base 21 in a third row of bases 21. This operation is repeated till a predetermined sets or rows of bases 21 are bonded together.

An end member 28 made of the same material as the bases 21 may be used to connect the ends of the adjacent two rows of bases 21 by adhesively bonding portions 29 at their end portions.

The bases 21 are adhesively bonded to one another as aforementioned to provide a plurality of cells 2 arranged in lattice form which cells are stuffed with earth, and seeds are sown in the earth in the cells and covered with earth. The seed grower 1 is then placed on the bed so that young plants may be cultivated therein.

Figure 4:
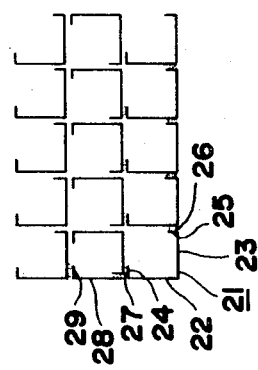
FIG. 4 is a plan view of a second embodiment of the seedling grower according to this invention.
Figure 5:
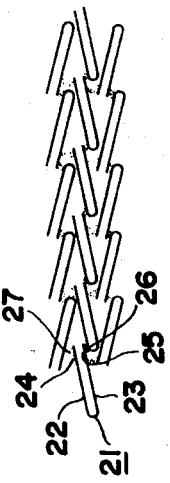
FIG. 5 is a plan view showing the method of fabrication of the embodiment shown in FIG. 4.

In fabricating the seedling grower shown in FIG. 4, the bases 21 made in an elongated tape form extending normal to the plane of FIG. 5 are folded in halves in the center and arranged in a row. They are adhesively bonded to one another so as to provide a set of such bases 21. Then, a plurality of such sets of bases 21 are arranged in rows in side by side relation and adhesively bonded together. A plurality of rows of bases adhesively bonded together in this way are cut transversely parallel to the plane of FIG. 5 into portions of a predetermined length to thereby provide a number of seedling growers 1.

The second embodiment of seedling grower according to this invention can be collapsed when not in use and can be developed by gripping the opposite ends by hands into a shape shown in FIG. 4 when it is used for sowing seeds in its cells to grow seedlings.

This embodiment can be made readily because one has only to adhesively bond the folded bases 21 to one another.

Figure 6:
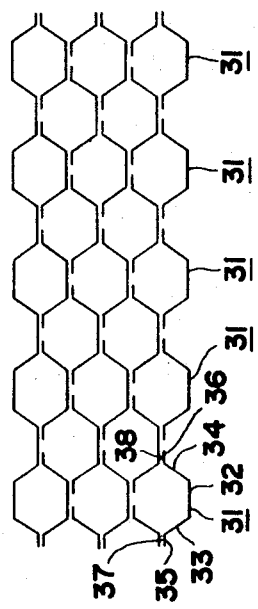
FIG. 6 is a plan view of a third embodiment of the seedling grower according to this invention.
Figure 7:
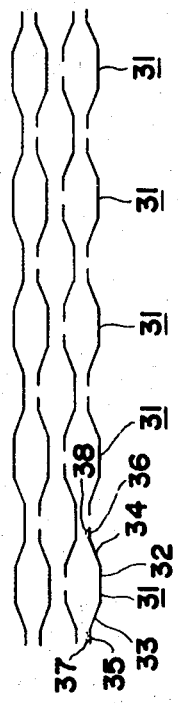
FIG. 7 is a plan view showing the method of fabrication of the embodiment shown in FIG. 6.

In contrast to the first and second embodiments of seedling grower according to this invention whose cells 2 are substantially square in plan view, a third embodiment shown in FIGS. 6 and 7 has cells made by bases which are hexagonal in plan view. The numeral 31 is a base which includes a center side wall 32 and side walls 33 and 34 disposed on opposite sides of center side wall 32. The side walls 33 and 34 are formed at their outer ends with bonding portions 35 and 36 respectively.

One base 31 is adhesively bonded at its bonding portions 35 and 36 to the center side walls 32 of another bases 31 at 37 and 38 respectively. This operation is repeated till a predetermined number of bases 31 are adhesively bonded together to provide hexagonal cells arranged in lattice form as shown in FIG. 6.

In the first to third embodiments shown and described above, each cell 2 which is stuffed with earth 3 is formed by two or three of bases 11, 21 or 31.

Figure 8:
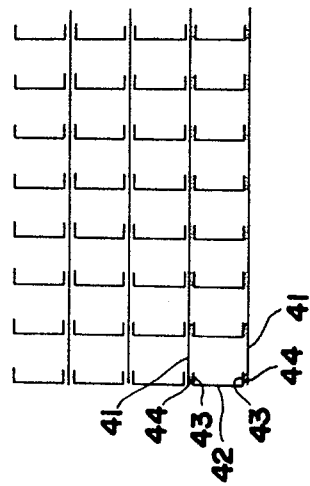
FIG. 8 is a plan view of a fourth embodiment of the seedling grower according to this invention.
Figure 9:
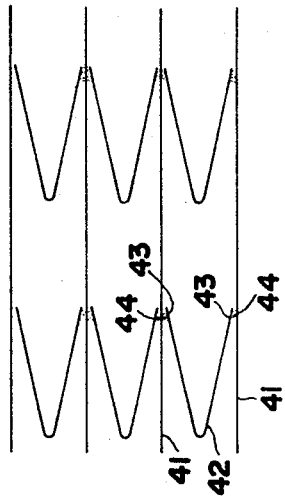
FIG. 9 is a plan view showing the method of fabrication of the embodiment shown in FIG. 8.

A fourth embodiment of the invention will now be described. As shown in FIGS. 8 and 9, this embodiment comprises a plurality of wall members 41 in web or strip form made of erosion resistant paper and arranged parallel to one another, and a plurality of partition wall members 42 made of the same material as the wall members 41 in the form of a letter U facing sideways. The partition wall members 42 are interposed between the rows of wall members 41 in strip form and spaced apart from one another a predetermined distance, and each partition wall member 42 is adhesively bonded at bonding portions 43 on opposite sides thereof to the adjacent wall members 41 at 44, so as to provide a seedling grower having cells arranged in lattice form.

In fabricating the embodiment shown in FIG. 8, the adhesive agent is applied to the portions 44 in predetermined positions on one wall member 41. The partition wall members 42 folded into two halves are arranged on the one wall member 41 at predetermined intervals and adhesively bonded at one bonding portion 43 thereof to the one wall member 41 at 44. Then, another wall member 41 having an adhesive agent applied to the portions 44 in predetermined positions thereon is placed above the folded partition wall members 42 adhesively bonded at one bonding portion 43 thereof to the one wall member 41, and adhesively bonded at the portions 44 thereof to the other bonding portion 43 of the partition wall members 42. In this way, the partition wall members 42 are successively bonded to the wall members 41 to provide a seedling grower 1 having cells 2 arranged in lattice form.

When not in use, the fourth embodiment described above can be collapsed and stored. When preparation is made for sowing seeds, the seedling grower may be held at the wall members 41 at opposite ends of the grower by hands and developed into a shape shown in FIG. 8.

This embodiment can also be fabricated readily because one has only to arrange folded partition wall members between the rows of wall members 41 and adhesively bond the former to the latter.

Figure 10:
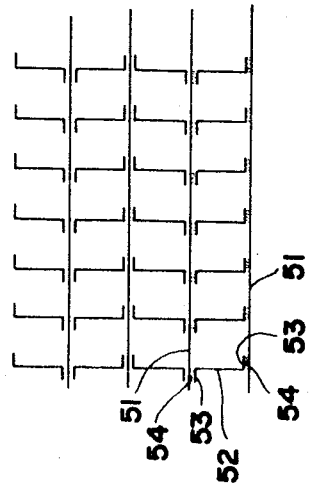
FIG. 10 is a plan view of a fifth embodiment of the seedling grower according to this invention.
Figure 11:
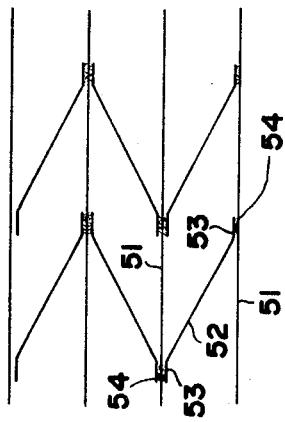
FIG. 11 is a plan view showing the method of fabrication of the embodiment shown in FIG. 10.

A fifth embodiment will be explained. As shown in FIGS. 10 and 11, this embodiment comprises a plurality of wall members 51 in web or strip form made of erosion resistant paper and arranged parallel to one another, and a plurality of partition wall members 52 made of the same material as the wall members 51 in substantially Z letter form. The partition wall members 52 are interposed between the rows of wall members 51 in strip form and spaced apart from one another a predetermined distance, and each partition wall member 52 is adhesively bonded at bonding portions 53 on opposite sides thereof to the adjacent wall members 51 at 54, so as to provide a seedling grower having cells arranged in lattice form.

In fabricating the fifth embodiment, the adhesive agent is applied to the portions 54 in predetermined positions on one wall member 51. The partition wall members 52 are arranged on the one wall member 51 at predetermined intervals and adhesively bonded at one bonding portion 53 thereof to the wall member 51 at 54. Then, another wall member 51 having an adhesive agent applied to the portions 54 in predetermined positions thereon is placed above the partition wall members 52 adhesively bonded at one bonding portion 53 thereof to the one wall member 51, and adhesively bonded to the partition wall members 52 at the other bonding portion 53 thereof. In this way, the partition wall members 52 are successively bonded to the wall members 51 to provide a seedling grower 1 having cells 2 arranged in lattice form.

When not in use, the fifth embodiment described above can be collapsed and stored. When preparation is made for sowing seeds, the seedling grower may be held at opposite ends by hands and developed into a shape shown in FIG. 10.

This embodiment can also be fabricated readily because one has only to arrange the wall members 51 and partition wall members 52 in superposed relation one above another and successively bond them together to provide a seedling grower.

A sixth embodiment shown in FIGS. 12 and 13 will be explained. As shown, each wall member 61 made of erosion resistant paper into a web or strip form is bent into a zigzag shape to alternately form substantially square elevated portions 62 and depressed portions 63. A plurality of wall members 61 formed in this manner are superposed one above another and parallel in parallel relation. The elevated portions 62 of one wall member 61 are adhesively bonded at two corners thereof to corners of the depressed portions 63 at 64 of another wall member 61 disposed above the one wall member 61. This operation is repeated till a seedling grower 1 having a predetermined number of cells 2 arranged in lattice form is provided.

Figure 13:
FIG. 13 is a plan view showing the method of fabrication of the embodiment shown in FIG. 12.

In fabricating the sixth embodiment, one wall member 61 is bent into a zigzag form and the adhesive agent is applied to portions 64 in predetermined positions on two corners of the elevated portions 62 as shown in FIG. 13. Then, another wall member 61 bent into the same zigzag shape as the one wall member 61 but directed in opposite direction is superposed above the one wall member 61 and bonded at the portions corresponding to the corners of the depressed portions 63 thereof to the portions corresponding to two corners of the elevated portions at 64 of the one wall member 61. In this way, the wall members 61 bent into a zigzag shape are adhesively bonded to one another to provide a seedling grower 1 having a predetermined number of cells 2 arranged in lattice form.

Figure 12:
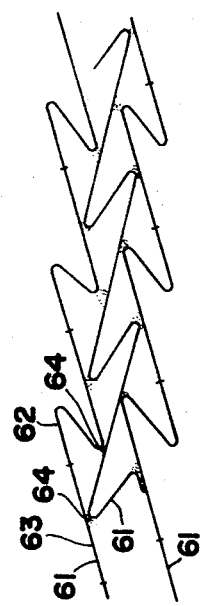
FIG. 12 is a plan view of a sixth embodiment of the seedling grower according to this invention.

When not in use, the embodiment shown in FIGS. 12 and 13 can be folded and stored. When preparation is made for sowing seeds, the seedling grower may be held at the wall members 61 on opposite sides of the grower by hands and stretched into the shape shown in FIG. 12.

In working this embodiment, the elevated portions 62 of one wall member 61 may be bonded at their corners to the corners of two depressed portions 63 of another wall member 61 adjacent to the one wall member 61 to provide cells 2 of substantially square shape arranged in lattice form, or the forward ends of elevated portions 62 of one wall member 61 may be inserted slightly between the depressed portions 63 of another wall member 61 adjacent to the one wall member 61 so as to bond the forward end portions of elevated portions 62 to the inner side surfaces of the depressed portions 63.

Figure 14:
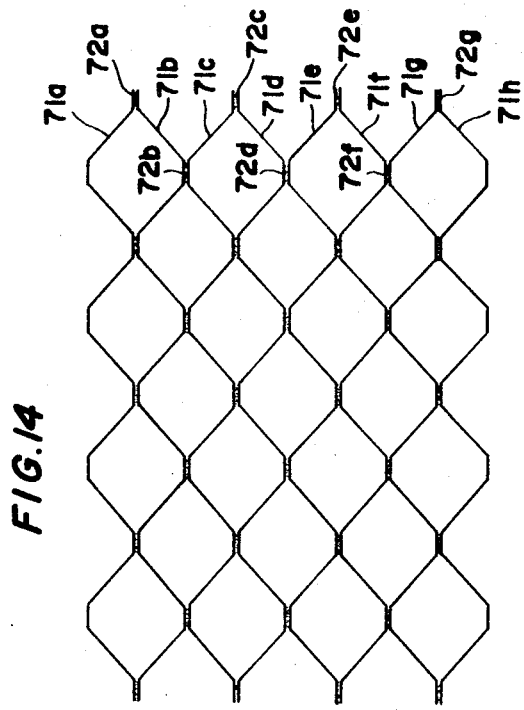
FIG. 14 is a seventh embodiment of the seedling grower according to this invention.
Figure 15:
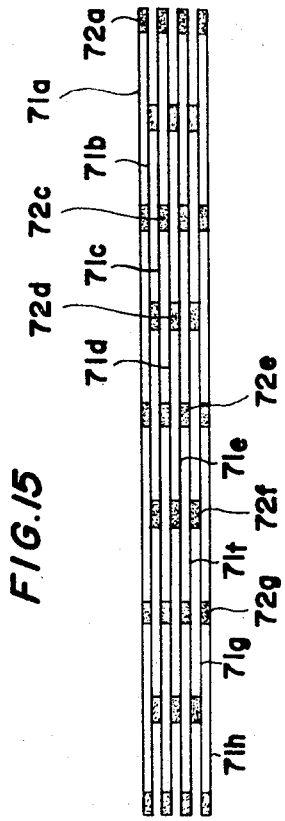
FIG. 15 is a plan view showing the method of fabrication of the embodiment shown in FIG. 14.

FIGS. 14 and 15 show a seventh embodiment of this invention comprising partition walls 71a, 71b, 71c, . . . made of paper created to render the structure erosion resistant which are adhesively bonded together at portions 72a, 72b, 72c, . . . and offset from one another a predetermined distance.

More specifically, the adhesive agent is applied to portions 72a spaced apart a predetermined distance from one another on the first partition wall 71a, and the second partition wall 71b is bonded thereto at portions thereof corresponding to the portions 72a on the wall 71a. The adhesive agent is applied to portions 72b on the second partition wall 71b each of which is disposed intermediate between the portions 72a on the partition wall 71a, and a third partition wall 71c is bonded thereto at portions thereof corresponding to the portions 72b on the partition wall 71b. Then, the adhesive agent is applied to portions 72c on the third partition wall 71c each of which is disposed intermediate between the portions 72b on the partition wall 71b or in positions corresponding to the portions 72a on the partition wall 71a, and a fourth partition wall 71d is bonded thereto at portions thereof corresponding to the portions 72c on the partition wall 71c. In this way, a plurality of partition walls 71a, 71b, 71c, . . . are adhesively bonded to one another at the portions 72a, 72b, 72c, . . . offset from one another a predetermined distance.

The seventh embodiment is also folded when not in use but may be stretched by holding the opposite ends thereof by hands when it is used for sowing seeds, so as to provide a plurality of substantially square cells arranged in lattice form.

Various embodiments of this invention have been described above. All of the embodiments have the cells 2 arranged in lattice form as shown in FIG. 1 which are stuffed with earth and seeds are sown therein so as to grow the seedlings 4.

The seedling grower 1 in which young plants have grown sufficiently big to warrant planting in the fields is placed on an inclined platform 82 of a planting machine 81 and caused to slide along the platform 82 till the forward end of the grower is engaged by a stopper 83 as shown in FIG. 16.

The platform 82 is provided with guide ribs 84 disposed on its underside and extending transversely thereof which guide ribs are received in mating guide grooves 86 formed in a machine bed 85 for supporting the platform 82 on the machine bed 85 for free sliding motion transversely of the planting machine 81.

The platform 82 is provided on its underside with internally threaded members 87 which threadably receive therein a threaded shaft 88 mounted on the machine bed 85 transversely thereof. The threaded shaft 88 is connected through a coupling mechanism 90 to a seedling delivery arm 89.

The seedling delivery arm 89 moves in a predetermined position in pivotal motion from its upper position to its lower position, and grips at its forward gripping portion 91 one seedling at one end of the front row of seedlings in the grower 1 and plants the same in the fields.

As the arm 89 performs this seedling planting operation, the threaded shaft 88 is rotated through the coupling mechanism 90 and moves the platform 82 transversely through the internally threaded members 87. Thus, it will be seen that, in response to one cycle of seedling planting operation performed by the arm 89, the seedling grower 1 is moved transversely by one pitch of cells so as to bring the next following seedling to a position in which the arm 89 grips and plants the same in the fields in the next operation cycle.

The arm 89 is effective not only to grip a seedling but also to break or tear the walls separating the seedling from the adjacent seedling, so that all the seedlings can be planted singly and independently of one another.

In all the embodiments described above, the adhesive agent used for bonding the walls together may be either soluble in water or not soluble in water.

When the adhesive agent used is soluble in water, the adhesive agent bonding the walls together is suitably dissolved by water contained in the earth as a result of spraying the seedlings, so that the adhesive agent suitably imparts tension to the walls in the earth while it is ready to fall off, thereby permitting the walls to peel off from one another once removed from the earth.

It is to be understood that the present invention is not limited to the square, diamond shaped and hexagonal cells of the seedling grower as shown, and that the cells may be annular in shape.

What I claim is:

1. A seedling grower for cultivating seedlings, comprising: a plurality of Z-shaped members bonded together at each end portion by a water-soluble adhesive agent in a lattice network to form cells in which seedlings are disposed in a growing medium, wherein one leg of said Z-shaped members is shorter than the other leg thereof, the shorter leg of one Z-shaped member being bonded to the longer leg of a second Z-shaped member and the longer leg of said one member being bonded to the longer leg of a third Z-shaped member adjacent the junction thereof with the cross piece connecting both legs of said third members, said first, second and third members together forming one of said cells.

2. A seedling grower for cultivating seedlings, comprising: a plurality of Z-shaped members bonded together at each end portion by a water-soluble adhesive agent in a lattice network to form cells in which seedlings are disposed in a growing medium, wherein one leg of one of said Z-shaped members is bonded to a leg of a second Z-shaped member and the second leg of said one member is bonded to one leg of a third Z-shaped member adjacent the junction thereof with the cross piece connecting the two legs of said third member, said first, second and third members together forming one of said cells.

* * * * *